April 17, 1956
K. K. BLACK ET AL
2,742,609
MEASURING APPARATUS
Filed Jan. 22, 1951
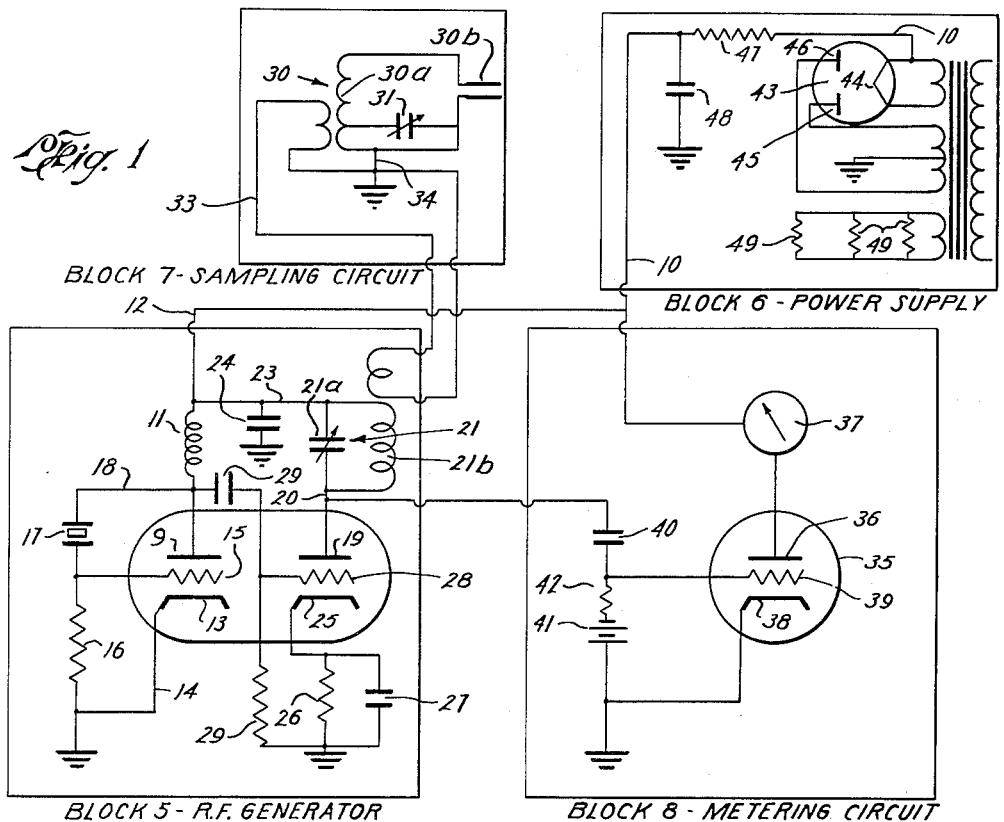
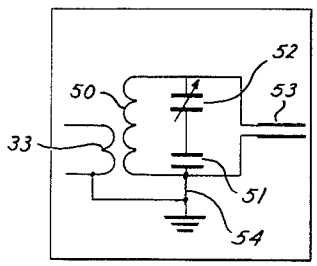 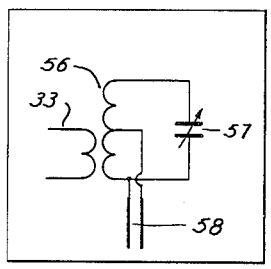 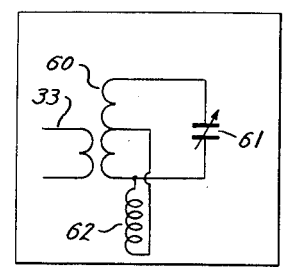
Kermit K. Black
James W. Hunt
INVENTORS
BY Browning & Simms
ATTORNEYS

United States Patent Office 2,742,609
Patented Apr. 17, 1956

2,742,609
MEASURING APPARATUS

Kermit K. Black and James W. Hunt, Houston, Tex., assignors to Dan H. Braman, Victoria, Tex.

Application January 22, 1951, Serial No. 207,139

11 Claims. (Cl. 324—61)

This invention relates to an apparatus for measuring the reactance of a circuit. In one of its aspects, it relates to an apparatus for measuring the capacitance of a circuit to determine the dielectric constant or other property of a substance forming a part of said capacitance. In another of its aspects, it relates to an apparatus for measuring the inductance of a circuit adapted to be at least partially inserted into an electrically conducting medium.

It is often desirable to measure the reactance of an element such as a capacitance or an inductance. One reason for such measurement is obviously to determine the particular value of capacitance or inductance exhibited by such element. Another reason for such measurement, probably of even greater importance, lies in the application of a capacitative or an inductive element to determine various properties or phenomena of a substance. For example, a capacitance which is adapted to have a substance inserted therein can be employed to measure the dielectric constant of such substance. Measurements of such constant can be correlated with the composition of the substance to provide an analytical method. Thus, for example, the purity of a mixture of substances can be readily determined inasmuch as varying concentrations of constituents in a mixture will affect a corresponding variation in the dielectric constant of such mixture in a manner more or less proportional to the change in concentration of the individual components contained in the admixture. Another application of such a reactance element can be made by inserting it into an electrically conducting liquid in order to determine the height of the liquid. Many other applications of such elements are apparent to one skilled in the art.

In order to be most useful, the apparatus employed to measure the reactance of such a capacitance or inductance should be one which is simple in nature and which can be easily transported from place to place with a minimum of effort and care. Also, inasmuch as many substances have dielectric constants which do not differ one from the other to any great degree, the apparatus for detecting the reactance should be extremely sensitive.

It is an object of this invention to provide an apparatus for measuring the value of a reactance, the apparatus being simple and rugged in nature and yet extremely sensitive to changes in the value of said reactance.

Still another object of this invention is to provide an apparatus for measuring the value of a reactance which can be easily transported from place to place and/or which is provided with an easily transportable means for coupling the reactance to be measured with the main portion of the reactance measuring apparatus.

Still another object of this invention is to provide an apparatus for measuring the value of a reactance wherein said reactance forms at least a part of a resonant means adapted to be tuned to be in resonance with another resonant means whereby any change in value of said reactance will cause the resonant means associated therewith to vary from the resonant frequency to thereby in turn cause said other resonant means to exhibit an increased flow of energy therein.

Yet another object of this invention is to provide an apparatus for measuring the value of a reactance wherein a first resonant circuit is resonated with a second resonant circuit containing said reactance whereby any change in reactance of said reactance will be reflected in an increased energy content of said first resonant circuit which change in energy is susceptible of measurement in order that said second resonant means can again be tuned to resonance with the first resonant means despite the change in reactance therein.

Other objects, advantages and features of this invention will become apparent to one skilled in the art upon the consideration of the written specification taken in conjunction with the attached drawing wherein:

Fig. 1 represents a schematic wiring diagram of the apparatus of this invention; and Figs. 2, 3 and 4 represent various embodiments of sampling circuits adapted to be substituted for that shown in Fig. 1.

In the drawings, like characters of reference designate corresponding parts throughout the several figures.

Referring now to the drawings, particularly to Fig. 1, there is shown outlined within four blocks the major elements of this invention. Block 5 represents a means for generating an alternating current in the radio-frequency range. Block 6 represents a means for supplying a direct current to the other elements of this invention which demand such current. Block 7 represents a sampling circuit which is coupled to the means for generating an alternating current shown in block 5. Block 8 represents a means for measuring an energy level and can be termed a "metering circuit" which likewise is connected to the means for generating an alternating current of block 5.

Thus, the apparatus of this invention comprises a means for generating a radio-frequency alternating current having a resonant means associated therewith which is coupled to the sampling circuit, the latter also having a resonant means associated therewith. The reactance to be measured is inserted in the resonant means of the sampling circuit in such a manner that it forms part of the reactance of such circuit. The resonant means of the sampling circuit is adapted to be adjusted to be in resonance with the resonant means of the means for generating an R. F. current. When so tuned, the resonant means of the sampling circuit will effectively absorb a great portion of the energy flowing in the resonant means of the R. F. generating means. The energy level measuring means is connected to the R. F. generating means in such a manner that the amount of energy flowing in the resonant means associated with said R. F. generating means can be measured. In this manner, when the resonant means of the sampling circuit and the resonant means of the R. F. generating means are tuned to be in resonance with each other, the amount of current flowing in the resonant means of the R. F. generating means will be measured by the energy level measuring means which will indicate it to be small. When the reactance which is to be measured and which is inserted in the resonant means of the sampling circuit is varied or changed, this will cause the resonant means of the sampling circuit to become out of resonance with the resonant means of the R. F. generating means and will, therefore, cause the energy level measuring means to indicate that the resonant means of the R. F. generating means has an increased amount of energy flowing therein. The resonant means of this sampling circuit can then be adjusted to again be in resonance with the resonant means of the R. F. generating means by adjusting it to a point where the energy level measuring means will again reflect a minimum energy flow in the R. F. generating means resonant means. Such adjustment of the resonant means of the sampling circuit is an indicium from which can be calculated the change in reactance of the reactance means incorporated in said circuit.

The function of the power supply means is to supply the required direct current for operating the power consuming elements of the other elements of this invention.

The means for generating an alternating current preferably of the radio-frequency range can be a Pierce type crystal oscillator connected to an amplifier containing a tuned resonant circuit in its plate-cathode circuit. The oscillator can be a vacuum tube having a plate 9 connected to the direct current supply wire 10 through radio-frequency choke 11 and wire 12. The cathode 13 of this tube can be connected through wire 14 to ground. Grid 15 disposed between plate 9 and cathode 13 is connected through grid leak resistance 16 to ground. A piezoelectric crystal 17, which can be a quartz crystal cut in such a fashion as to act as a resonant circuit of a very high Q, is connected between plate circuit of the tube and the filament thereof by means of wire 18 as shown in the drawing.

A means for amplifying the alternating current generated in the oscillator can comprise a tube having a plate 19. Plate 19 is coupled by means of wire 20 to a resonant circuit designated generally as 21 which comprises a variable capacity condenser 21a connected in parallel with an inductance coil 21b. The values of capacitance 21a and inductance 21b should be such that the resonant circuit formed thereby can be adjusted to be in resonance with the frequency of the oscillator and yet exhibit as high a Q as is possible. Resonant circuit 21 is connected by means of wire 23 to the wire 12 and thence to the power supply shown in block 6. A plate by-pass condenser 24 can be grounded from wire 23 in order to prevent alternating current from passing to the power supply. Cathode 25 of the amplifier tube is connected to ground through cathode bias resistance 26. A by-pass capacitance 27 can be connected across the resistance 26 to provide a low impedance path for alternating current to the cathode. Grid 28 of the amplifier tube is coupled through capacitance 29 to the plate circuit of the oscillator to permit a ready passage of the alternating current generated by the oscillator and yet prevent direct current from being impressed upon grid 28. A resistance 29 is connected from grid 28 to ground.

The sampling circuit can be comprised of a resonant means 30 including an inductance 30a connected in parallel with the capacitance 30b. Capacitance 30b is that capacitance which will vary in value or that which it is desired to measure the capacitance thereof. Connected across at least a portion of the length of inductance 30a and in parallel thereto is a variable capacitance 31. The thus formed resonant circuit 30 can be coupled to the resonant circuit 21 by means of a linking coil 33 which is preferably associated with the low side of each of resonant circuits 21 and 30. Linking coil 33 and resonant circuit 30 can be grounded through wire 34 as shown. When so constructed and arranged resonant circuit 30 can be tuned, such as by adjusting capacitance 31, to be in resonance with resonant circuit 21.

A means for measuring the energy level of resonant circuit 21 of the radio-frequency amplifier is shown in block 8. Such means can comprise one adapted to measure the voltage drop across resonant circuit 21, and, as shown, can be a tube 35 having its plate 36 connected through a current meter such as ammeter 37 to the source of direct current in wire 10. Cathode 38 of tube 35 is grounded. The grid 39 of tube 35 is coupled through capacitance 40 to the amplifier of the radio-frequency generating means at a point between the plate 19 and resonant circuit 21. Grid bias for grid 39 is provided by a source of direct current 41 connected thereto through a resistance 42.

A source of direct current, herein termed a power supply, can be comprised of a center-tap full-wave rectifier. Such rectifier can be a tube 43 having its cathode 44 connected through wire 10 to the elements of the other portion of the circuit requiring a direct current. The plates of tube 43 are each connected to an end of a secondary coil which is grounded at its center-point. A resistance-capacitance filter comprised of resistance 47 and capacitance 48, which is grounded, can be inserted in the output of the power supply to smooth the pulsating current generated thereby.

Filaments 49 can be connected to a secondary coil of a transformer as shown and are employed to heat the cathodes of the various tubes in blocks 5 and 8.

In operation, the oscillator feeds back oscillations from the plate circuit through crystal 17 to the grid 15 thereby providing self-excitation of a very stable character. Current for the plate-cathode circuit flows from the ground to cathode 13 and thence from plate 9 through choke 11 to the power supply. Resistance 16 maintains the desired bias on grid 15.

The product radio-frequency oscillations of the oscillator are transmitted from plate 9 to grid 28 of the amplifier tube through capacitance 29 which prevents any direct current from being impressed upon the grid. The alternating current produced in the oscillator is prevented from interfering with the power supply by choke 11. Resonant circuit 21 is tuned to be in resonance with the oscillator frequency, or some multiple of this frequency, by adjusting capacitance 21a. Likewise, capacitance 31 is adjusted so that resonant circuit 30 is in resonance with resonant circuit 21. When so adjusted, the energy flowing in resonant circuit 21 will be absorbed to a great extent by resonant circuit 30, and ammeter 37 will read a minimum value.

The energy level or the amount of energy flowing in resonant circuit 21 is measured by the metering circuit. In operation of this metering circuit, current from the plate circuit of the amplifier tube flows through coupling condenser 40 and is impressed upon grid 39 of tube 35. This grid is biased to a negative potential by the battery 41 acting through resistance 42. The potential impressed across capacitance 40 acts to cancel some of the potential impressed upon a grid by battery 41 thereby permitting current flow from the cathode 38 to the plate 36 of tube 35 to thereby effect a reading on ammeter 37 proportional to the potential impressed on grid 39. The reading on ammeter 37 thus can be correlated to read the voltage drop across resonant circuit 21 of the amplifier tube which is a measure of the amount of energy in such circuit.

When it is desired, for example, to measure dielectric constant of a substance such as an oil, such substance is inserted between the plates of capacitance 30b. This changes the capacitance of capacitance 30b and accordingly will change the resonant frequency of resonant circuit 30. Such change causes the circuit to become out of resonance with resonant circuit 21 and, accordingly, less energy will be absorbed from resonant circuit 21. This decrease in energy absorption will be reflected in an increase in energy content of resonant circuit 21 which in turn will cause an increased reading on ammeter 37 due to the higher potential across resonant circuit 21. Capacitance 31 can then be adjusted to again re-resonate resonant circuit 30 with resonant circuit 21. The point of resonance will be indicated by the ammeter 37 returning to its original reading. When in resonance, the change in capacitance of capacitance 31 caused by insertion of the substance therein will be the difference between the original and the new value of capacitance 31. From this the dielectric constant of the substance inserted in capacitance 31 can be readily calculated.

In Fig. 2 is shown another embodiment of the sampling circuit which can be substituted for that shown in Fig. 1, block 7. In the circuit shown in Fig. 2, an inductance 50 is connected in parallel with a fixed condenser 51 and a variable condenser 52. A condenser 53 is connected in parallel with condensers 51 and 52. Linking coil 33 is coupled with inductance in the same manner as in the sampling circuit shown in Fig. 1. Linking coil 33 and the just described resonant circuit can be grounded through wire 54. The sampling circuit of Fig. 2 can be employed when it is desired to have the measuring capacitance 53 of a smaller value, and/or the adjustable or scale capacitance 52 of lesser sensitivity than the adjustable or scale capacitance 31 of Fig. 1. In operation the method is the same as that shown in Fig. 1, with capacitance 52 being adjusted to re-resonate the circuit after a substance has been inserted between the plates of capacitance 53.

Fig. 3 shows another embodiment of the sampling circuit of this invention which is particularly adapted to be employed in measuring liquid level of fluids contained in tanks. According to this embodiment, the fluid should be of an electrically non-conducting type such as a petroleum oil. As shown in Fig. 3, link coil 33 is employed to link resonant circuit 21 to the resonant circuit of the sampling circuit. The latter is comprised of an inductance 56 in parallel with a variable capacitance 57. Also connected in parallel across inductance 56, for at least a portion of its length, are two capacitance elements 58. These elements can be plates, wires, or the like, which can have a capacitative effect and which are adapted to be inserted in a fluid and to have the capacitance existing therebetween changed by the amount of fluid existing between the elements. Thus, the sampling circuit of Fig. 3 can be mounted in a tank of petroleum oil in such a manner that the capacitance elements 58 extend vertically the depth of the tank. Then as the level of oil contained in the tank rises and falls, the capacitance of capacitance elements 58 will vary in accordance with the depth of oil in the tank and variable capacitance 57 can be adjusted to tune its resonant circuit with resonant circuit 21 to have the two resonant circuits in tune after a change in liquid level. The capacitance 57 can be calibrated to give a direct reading of liquid level contained in the tank.

The embodiment of the sampling circuit shown in Fig. 4 is particularly adapted to measure the liquid level of an electrically conducting fluid. For example, such element can be employed to measure the rise and fall of tides or the amount of water stored in a storage tank. As shown in Fig. 4, a resonant circuit comprised of inductance 60 connected in parallel with a variable capacitance 61 is linked to resonant circuit 21 by a linking coil 33. Connected in parallel across inductance 60 for at least a portion of its length is an additional inductance 62. When inductance 62 is inserted in an electrically conducting liquid, a portion of its effective length will be shunted out by such liquid thereby varying the inductance of coil 62. Thus, such a sampling circuit can be mounted to measure the rise and fall of tides. The variation in level of the sea water will cause a variation in the effective length of inductance 62, thereby varying the inductance connected into the resonant circuit of Fig. 4. Variable capacitance 61 can be adjusted to tune the circuit to resonance with resonant circuit 21 with each change of liquid level. Such variable capacitance can be calibrated to give a direct reading in feet and inches, for example, of the liquid level of the conducting fluid being measured.

It is contemplated that the tightness or the degree of coupling between inductances 21b and 30a can be varied to control the sensitivity of the sampling circuit. For example, when the difference in dielectric constants between two substances is small and such substances are to be successively inserted in capacitance 30b, inductances 30a and 21b should be tightly coupled to provide maximum sensitivity.

Although the description of the operation of the illustrated apparatus has been to the effect that capacitance 31, for example, is employed to retune resonant means 30 with resonant means 21 each time a measurement of capacitance 30b is taken, it is possible to tune means 30 with means 21 at the start of a series of measurements and then to leave it in such position and derive the desired measurement of change of capacitance or inductance by calibrating meter 37 to yield such measurement directly. Thus, meter 37 will reflect changes in the value of capacitance 30b and resonant means 30 can be thus permitted to remain de-tuned while the desired readings are being taken.

It is contemplated that any one of the resonant means of the sampling circuits of Figs. 1 to 4 can be substituted for the resonant means 21 of the R. F. generator thereby eliminating one resonant means from the apparatus. This can be done, for example, by connecting wires 20 and 23 to opposite ends of any one of inductances 30a, 50, 56 and 60 and removing resonant means 21 and linking coil 33 from the circuit. When the resonant means of the sampling circuit is so connected, the elements 30b, 53, 58 and 62 can be employed in the manner above described to measure dielectric constants, liquid levels and the like except that meter 37 will read a maximum when the resonant means so connected to wires 20 and 23 is tuned to the oscillatory frequency or a multiple thereof and will exhibit a lesser reading when not so tuned. Thus by substituting one of the resonant means of the sampling circuits for the resonant means 21 of the R. F. generator, one resonant means (21) and a coupling means (coil 33) is eliminated and the metering circuit is still employed as such in a manner that reflects a balanced circuit coincident with maximum meter readings. Although the just described modification somewhat simplifies the apparatus of this invention, it is not preferred to the apparatus employing both resonant means 21 and a sampling circuit because it has been found that when employing the latter apparatus, the sensitivity of measurement is unexpectedly and greatly increased. In other words, the sensitivity of the apparatus modified to have the resonant means of the sampling circuit substituted for resonant means 21 is not nearly so great as that of the apparatus shown in the drawings. Also, when such substitution is made, it becomes necessary to transport the entire apparatus to the place where the measurement is to be made whereas, as shown in Fig. 1, the preferred apparatus can be situated so that the apparatus of blocks 5, 6 and 8 can be at a position remote from the sampling circuit of block 7. For these and other reasons, it is more preferable to employ the apparatus having both a sampling circuit and resonant means 21.

There are many advantages which flow from the employment of the apparatus of this invention. One of these advantages is that the apparatus is very sensitive to changes in value of the reactance of the element inserted in the resonant circuit of the sampling circuit. Accordingly, very accurate measurements of the characteristics or position of the substance associated with such reactance, such as by being inserted between the plates of a capacitance, can be readily made. Such sensitivity renders the apparatus of this invention particularly applicable to many uses. Thus, the capacitance 31 of the sampling circuit shown in Fig. 1 can be inserted in a pipeline carrying, from time to time, different types of fluid. When the dividing line between one lot of fluid and a second lot of fluid arrives at the pipeline terminal, the difference in dielectric constant of the two fluids will be readily reflected by the apparatus of this invention which can be employed to actuate switching valves to pass the second lot of fluid into a tank different from that in which the first lot of fluid is passed. Such actuation can be accomplished by connecting suitable relays and the like into the plate-cathode circuit of tube 35 in such a manner that they are actuated when current flows through such circuit in an amount more than a predetermined minimum. Also, the high degree of sensitivity of the apparatus of this invention permits accurate measurement of the purity of a mixture of materials. For example, when the dielectric constant of a pure substance is known, variation of the dielectric constant from such value can be indicia of the amount of impurities present in a sample of the substance.

Another advantage of the apparatus of this invention is that it is relatively stable, and any small amount of drift of frequency which may be encountered will not affect its accuracy. Also, the amount of power required to operate the apparatus is very small and batteries can be employed over long periods of time to furnish the necessary current without demanding recharging.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. An apparatus for measuring reactance which comprises means for generating an alternating current including a first resonant means, a second resonant means coupled to said first resonant means, said second resonant means containing said reactance to be measured therein, said generating means having a high frequency stability of the order of that of a crystal type oscillator and of the type having an output frequency which will be substantially unaffected by tuning and detuning of the first and second resonant means into and out of resonance with each other, and measuring means responsive to the change in energy in the first resonant means occasioned by the tuning and detuning of the second resonant means.

2. An apparatus for measuring reactance which comprises, in combination, means for generating an alternating radio-frequency current having a resonant means associated therewith, a second resonant means coupled to said first resonant means and having said reactance to be measured connected therewith as part of the second resonant means, said second resonant means being adapted to be tuned to be in resonance with said first resonant means, said generating means having a high frequency stability of the order of that of a crystal type oscillator and of the type having an output frequency which will be substantially unaffected by tuning and detuning of the first and second resonant means into and out of resonance with each other, and measuring means responsive to the change in energy in the first resonant means occasioned by the tuning and detuning of the second resonant means.

3. The apparatus of claim 2 wherein said reactance to be measured is a capacitative reactance.

4. The apparatus of claim 2 wherein said reactance to be measured is an inductive reactance.

5. An apparatus for measuring the reactance of an element which comprises a stable crystal type oscillator, an amplifier connected to said oscillator and having a plate-cathode circuit containing a tank circuit adapted to be in resonance with the frequency of said oscillator, a second tank circuit containing the element whose reactance is to be measured as a part of the reactance of said second tank circuit, said second tank circuit having an adjustable capacitance therein adapted to tune said second tank circuit to be in resonance with said first tank circuit, said first and second tank circuits being coupled by a linking coil, and indicating means responsive to the change in energy in said first tank circuit occasioned by the tuning and detuning of the second tank circuit, said indicating means comprising an electron tube with means to control flow through said tube in response to said energy change and an indicator responsive to current flow in the plate circuit of the electron tube.

6. The apparatus of claim 5 wherein said second tank circuit comprises an inductance, an adjustable capacitance and an additional capacitance in parallel thereto, said additional capacitance being adapted to receive a substance for measurement of the properties of said substance.

7. The apparatus of claim 5 wherein said second tank circuit comprises, in parallel, an adjustable capacitance and an inductance, said inductance having an additional capacitance in parallel with at least part of its effective length adapted to receive a substance to measure dielectric constant of said substance.

8. The apparatus of claim 5 wherein said second tank circuit comprises, in parallel, an adjustable capacitance and an inductance, said inductance having a second inductance in parallel with at least a portion of its length whereby the value of said second inductance can be varied by immersing at least a part of its length in a liquid.

9. An apparatus for measuring reactance which comprises an oscillator having a high frequency stability of the order of that of a stable crystal type oscillator, an amplifier driven by said oscillator and having an output circuit containing a first resonant means adapted to be in resonance with the frequency of said oscillator, a second resonant means coupled to said first resonant means and containing said reactance to be measured as a part of the reactance of said second resonant means, said second resonant means being adjustable so as to be tuned to resonance with the first resonant means and measuring means responsive to a change in energy in said first resonant means occasioned by the tuning and detuning of the second resonant means whereby the second resonant means can be detuned from the first resonant means and the extent of such detuning accurately determined by said measuring means without the detuning causing a significant shift in the output frequency of said oscillator and in said first resonant means.

10. The apparatus of claim 9 wherein said first and second resonant means are coupled by a non-resonant line so that the second resonant means can be portable and situated remotely from the first resonant means without varying the characteristics of the first and second resonant means.

11. An apparatus for measuring reactance which comprises means for generating an alternating radio-frequency current, a resonant means adapted to be tuned to resonance with said generated current, said resonant means containing the reactance to be measured as part of the resonant circuit, said generating means having a high frequency stability of the order of that of a crystal type oscillator and of the type having an output frequency substantially unaffected by tuning and detuning of said resonant means into and out of resonance with said generating means, and measuring means responsive to the change in energy in the generating means occasioned by the tuning and detuning of said resonant means.

References Cited in the file of this patent

UNITED STATES PATENTS

| | | |
|---|---|---|
| 1,781,153 | Allen | Nov. 11, 1930 |
| 2,043,241 | Eyer | June 9, 1936 |
| 2,076,944 | Howe | Apr. 13, 1937 |
| 2,135,017 | Sharland | Nov. 1, 1938 |
| 2,231,035 | Stevens et al. | Feb. 11, 1941 |
| 2,519,668 | Konigsberg | Aug. 22, 1950 |
| 2,615,960 | Erwin | Oct. 28, 1952 |

OTHER REFERENCES

Radio World, August 1936, pages 13, 14, 15.

Hund: High-Frequency Measurements, 1st ed., McGraw-Hill Book Company, New York, 1933, pages 50–51.